US007675831B2

(12) United States Patent
Minemura

(10) Patent No.: US 7,675,831 B2
(45) Date of Patent: Mar. 9, 2010

(54) RECORDING METHOD AND OPTICAL DISK APPARATUS USING THE METHOD

(75) Inventor: Hiroyuki Minemura, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 573 days.

(21) Appl. No.: 11/675,730

(22) Filed: Feb. 16, 2007

(65) Prior Publication Data

US 2008/0094991 A1 Apr. 24, 2008

(30) Foreign Application Priority Data

Oct. 23, 2006 (JP) ............................ 2006-287886

(51) Int. Cl.
*G11B 7/00* (2006.01)

(52) U.S. Cl. .................................................. 369/59.11

(58) Field of Classification Search ................ 369/59.1, 369/59.11, 59.12, 59.24, 59.25
See application file for complete search history.

(56) References Cited

U.S. PATENT DOCUMENTS 6,678,228 B1 1/2004 Kando et al.
6,925,040 B1 * 8/2005 Maeda et al. .............. 369/47.1
2005/0007840 A1 1/2005 Watanabe et al.
2005/0249318 A1 11/2005 Minemura
2005/0254389 A1 11/2005 Minemura
2006/0083135 A1 4/2006 Minemura
2006/0087947 A1 4/2006 Minemura et al.

FOREIGN PATENT DOCUMENTS

JP 2003-187443 7/2003
JP 2004-280891 10/2004

OTHER PUBLICATIONS

S. Furumiya, et al., "Over 500 Mbps Data Recording on Write-Once Media with L-Shaped Write Strategy", Proc. IOSM/ODS, 2005, TuP26.
H. Minemura, et al., "High-Speed Write/Read Techniques for Blu-Ray Write-Once Discs", Jpn. J. Appl. Phys. vol. 45, pp. 1213-1218, 2006.

* cited by examiner

*Primary Examiner*—Nabil Z Hindi
(74) *Attorney, Agent, or Firm*—Antonelli, Terry, Stout & Kraus, LLP.

(57) ABSTRACT

In order to meet the requirement for enhancing the speed of an optical disk apparatus, it is necessary to have a write strategy for compensating thermal interference during recording at high speed on a high-density optical disk such as BD. However, there has been no known technology for such a write strategy. By shifting the start position and the end position of a recording pulse in accordance with the preceding mark length, the preceding space length, the recording mark length, and the following space length, excellent jitter values have been obtained. Further, by simplifying parameters when the preceding pattern contains the shortest mark and the shortest space which cause large thermal interference, 12× BD recording can be achieved with the number of parameters smaller than double the number of parameters of the conventional 4×4 type write strategy.

19 Claims, 21 Drawing Sheets

Type-2 Strategy (m-s-m)

FIG. 1B

Type-2 Strategy (m-s-m)

Adaptive parameters, Tsfp and Telp, for $m_1T$ marks in NRZI sequence of ($m_0T$) mark - ($s_0$ T) space – ($m_1T$) mark – ($s_1$ T )space; see Fig.1A.

(a) Main Table; Tsfp and Telp table for $m_0 \neq 2$ or $s_0 \neq 2$

| Tsfp | $m_1=2$ | $m_1=3$ | $m_1=4$ | $m_1 \geqq 5$ |
|---|---|---|---|---|
| $s_0=2$ | F1 | F2 | F3 | F4 |
| $s_0=3$ | F5 | F6 | F7 | F8 |
| $s_0=4$ | F9 | F10 | F11 | F12 |
| $s_0 \geqq 5$ | F13 | F14 | F15 | F16 |

| Telp | $m_1=2$ | $m_1=3$ | $m_1=4$ | $m_1 \geqq 5$ |
|---|---|---|---|---|
| $s_1=2$ | L1 | L2 | L3 | L4 |
| $s_1=3$ | L5 | L6 | L7 | L8 |
| $s_1=4$ | L9 | L10 | L11 | L12 |
| $s_1 \geqq 5$ | L13 | L14 | L15 | L16 |

(b) Sub Table; Tsfp and Telp table for $m_0=2$ and $s_0=2$

| Tsfp | $m_1=2$ | $m_1=3$ | $m_1=4$ | $m_1 \geqq 5$ |
|---|---|---|---|---|
| $s_0=2$ | F'1 | F'2 | F'3 | F'4 |
| $s_0=3$ | Same as Main Table | | | |
| $s_0=4$ | | | | |
| $s_0 \geqq 5$ | | | | |

| Telp | $m_1=2$ | $m_1=3$ | $m_1=4$ | $m_1 \geqq 5$ |
|---|---|---|---|---|
| $s_1=2$ | L'1 | L'2 | L'3 | L'4 |
| $s_1=3$ | L'5 | L'6 | L'7 | L'8 |
| $s_1=4$ | L'9 | L'10 | L'11 | L'12 |
| $s_1 \geqq 5$ | L'13 | L'14 | L'15 | L'16 |

Parameters F'5 to F'16 are equal to F5 to F16

DVD-RAM Strategy

DVD-RAM Strategy

Adaptive parameters, Tsfp and Telp, for $m_1T$ marks in NRZI sequence of
$(s_0 T)$ space – $(m_1 T)$ mark – $(s_1 T)$ space; see Fig.2A.

| Tsfp | $m_1=2$ | $m_1=3$ | $m_1=4$ | $m_1 \geq 5$ |
|---|---|---|---|---|
| $s_0=2$ | F1 | F2 | F3 | F4 |
| $s_0=3$ | F5 | F6 | F7 | F8 |
| $s_0=4$ | F9 | F10 | F11 | F12 |
| $s_0 \geq 5$ | F13 | F14 | F15 | F16 |

| Telp | $m_1=2$ | $m_1=3$ | $m_1=4$ | $m_1 \geq 5$ |
|---|---|---|---|---|
| $s_1=2$ | L1 | L2 | L3 | L4 |
| $s_1=3$ | L5 | L6 | L7 | L8 |
| $s_1=4$ | L9 | L10 | L11 | L12 |
| $s_1 \geq 5$ | L13 | L14 | L15 | L16 |

Schematic of tester

FIG. 4

Tester Specifications

| | | |
|---|---|---|
| Model Number of Spin Stand | | Shibasoku LM330A |
| Write Pulse | Pulse Generator | 12.8GHz |
| | Rise Time | 0.7ns |
| | Peak Power | 17mW |
| Head Amp | Fc | 145MHz |
| Spindle | Rot. Speed | 11,000rpm |
| Disk | Track Pitch | 0.32 $\mu$m Groove |
| Recording Density | Tw | 74.5nm |
| | Capacity | 25GB |

Pulse Generator

Laser Driver Circuit

FIG. 7
Results of 12X Recording
| 12X BD Recording Results | Conventional 4x4 Tables | 4x4 Tables with preceding-pattern compensation |
|---|---|---|
| Limit Equalizer Wave at 1X Speed | 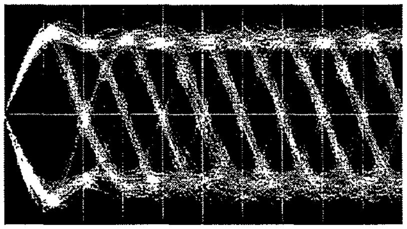 | 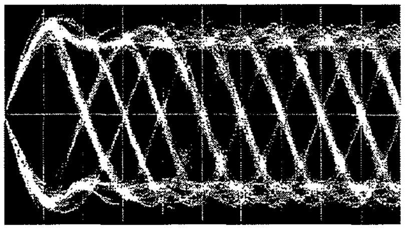 |
| Jitter Measurement | 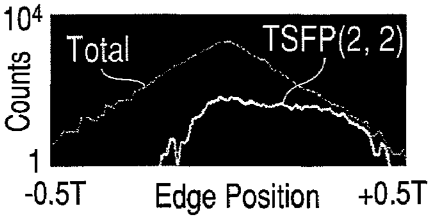  Jitter=12.8% | 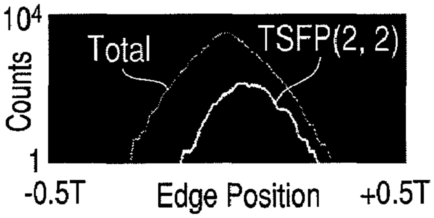  Jitter=5.4% |
| 2m-2s-2m Wave | 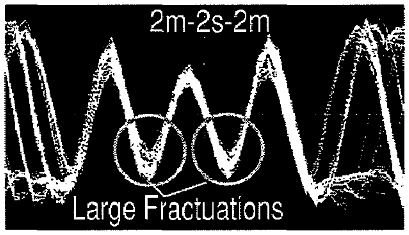  | 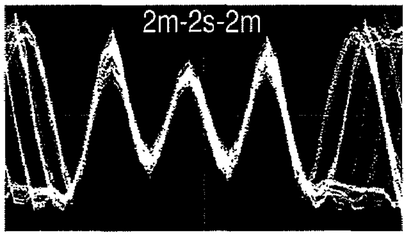  |

FIG. 8

Type-1 Strategy (m-s-m-s)

Adaptive parameters, Tsfp and Telp, for $m_1$T marks in NRZI sequence of ($m_0$T) mark - ($s_0$ T) space – ($m_1$T) mark – ($s_1$ T )space.

(a) Main Table; Tsfp and Telp table

| Tsfp | $m_1$=2 | $m_1$=3 | $m_1$=4 | $m_1 \geqq 5$ |
|---|---|---|---|---|
| $s_0$=2 | F1 | F2 | F3 | F4 |
| $s_0$=3 | F5 | F6 | F7 | F8 |
| $s_0$=4 | F9 | F10 | F11 | F12 |
| $s_0 \geqq 5$ | F13 | F14 | F15 | F16 |

| Telp | $m_1$=2 | $m_1$=3 | $m_1$=4 | $m_1 \geqq 5$ |
|---|---|---|---|---|
| $s_1$=2 | L1 | L2 | L3 | L4 |
| $s_1$=3 | L5 | L6 | L7 | L8 |
| $s_1$=4 | L9 | L10 | L11 | L12 |
| $s_1 \geqq 5$ | L13 | L14 | L15 | L16 |

(b) Tsfp Compensation Table

Tsfp($s_0$,$m_1$) in Main Table (F1 to F16) are modified as Tsfp($s_0$,$m_1$) +⊿Tsfp($m_0$,$s_0$,$m_1$)

| ⊿Tsfp($m_0$=2) | ⊿Tsfp($m_0$=3) | ⊿Tsfp($m_0$=4) | ⊿Tsfp($m_0 \geqq 5$) |
|---|---|---|---|
| ⊿Tsfp Table ⊿222 to ⊿255 | ⊿Tsfp Table ⊿322 to ⊿355 | ⊿Tsfp Table ⊿422 to ⊿455 | ⊿Tsfp Table ⊿522 to ⊿555 (are all zero.) |

(c) Telp Compensation Table

Telp($m_1$,$s_1$) in Main Table (L1 to L16) are modified as Telp($m_1$,$s_1$) +⊿Telp($m_0$,$s_0$,$m_1$,$s_1$)

| | | | |
|---|---|---|---|
| ⊿Telp($m_0$,$s_0$)=(2,2) | ⊿Telp($m_0$,$s_0$)=(2,3) | ⊿Telp($m_0$,$s_0$)=(2,4) | ⊿Telp($m_0$,$s_0$)=(2,≧5) |
| ⊿Telp Table ⊿2222 to ⊿2255 | ⊿Telp Table ⊿2322 to ⊿2355 | ⊿Telp Table ⊿2422 to ⊿2455 | ⊿Telp Table ⊿2522 to ⊿2555 |
| ⊿Telp($m_0$,$s_0$)=(3,2) | ⊿Telp($m_0$,$s_0$)=(3,3) | ⊿Telp($m_0$,$s_0$)=(3,4) | ⊿Telp($m_0$,$s_0$)=(3,≧5) |
| ⊿Telp Table ⊿3222 to ⊿3255 | ⊿Telp Table ⊿3322 to ⊿3355 | ⊿Telp Table ⊿3422 to ⊿3455 | ⊿Telp Table ⊿3522 to ⊿3555 |
| ⊿Telp($m_0$,$s_0$)=(4,2) | ⊿Telp($m_0$,$s_0$)=(4,3) | ⊿Telp($m_0$,$s_0$)=(4,4) | ⊿Telp($m_0$,$s_0$)=(4,≧5) |
| ⊿Telp Table ⊿4222 to ⊿4255 | ⊿Telp Table ⊿4322 to ⊿4355 | ⊿Telp Table ⊿4422 to ⊿4455 | ⊿Telp Table ⊿4522 to ⊿4555 |
| ⊿Telp($m_0$,$s_0$)=(≧5,2) | ⊿Telp($m_0$,$s_0$)=(≧5,3) | ⊿Telp($m_0$,$s_0$)=(≧5,4) | ⊿Telp($m_0$,$s_0$)=(≧5 ,≧5) |
| ⊿Telp Table ⊿5222 to ⊿5255 | ⊿Telp Table ⊿5322 to ⊿5355 | ⊿Telp Table ⊿5422 to ⊿5455 | ⊿Telp Table ⊿5522 to ⊿5555 (are all zero) |

Detail Configuration of the Sub Tables are as follows

| ⊿Tsfp | $m_1$=2 | $m_1$=3 | $m_1$=4 | $m_1 \geqq 5$ |
|---|---|---|---|---|
| $s_0$=2 | $⊿_{222}$ | $⊿_{223}$ | $⊿_{224}$ | $⊿_{225}$ |
| $s_0$=3 | $⊿_{232}$ | $⊿_{233}$ | $⊿_{234}$ | $⊿_{235}$ |
| $s_0$=4 | $⊿_{242}$ | $⊿_{243}$ | $⊿_{244}$ | $⊿_{245}$ |
| $s_0 \geqq 5$ | $⊿_{252}$ | $⊿_{253}$ | $⊿_{254}$ | $⊿_{255}$ |

Pulse( 2, 2, 2, 2)=0000000000000000002222222222222222222222222222222222
Pulse( 2, 2, 2, 3)=000000000000000000222222222222222222222222222222222
Pulse( 2, 2, 2, 4)=000000000000000000222222222222222222222222222222222
Pulse( 2, 2, 2, 5)=000000000000000000222222222222222222222222222222222
Pulse( 3, 2, 2, 2)=000000000000000022222222222222222222222222222222222
Pulse( 3, 2, 2, 3)=000000000000000022222222222222222222222222222222222
Pulse( 3, 2, 2, 4)=00000000000000002222222222222222222222222222222222
Pulse( 3, 2, 2, 5)=00000000000000002222222222222222222222222222222222
Pulse( 4, 2, 2, 2)=000000000000000022222222222222222222222222222222222
Pulse( 4, 2, 2, 3)=000000000000000022222222222222222222222222222222222
Pulse( 4, 2, 2, 4)=00000000000000002222222222222222222222222222222222
Pulse( 4, 2, 2, 5)=00000000000000002222222222222222222222222222222222
Pulse( 5, 2, 2, 2)=000000000000000022222222222222222222222222222222222
Pulse( 5, 2, 2, 3)=000000000000000022222222222222222222222222222222222
Pulse( 5, 2, 2, 4)=00000000000000002222222222222222222222222222222222
Pulse( 5, 2, 2, 5)=00000000000000002222222222222222222222222222222222
Pulse( 5, 3, 2, 2)=00000000000000002222222222222222222222222222222222
Pulse( 5, 3, 2, 3)=00000000000000002222222222222222222222222222222222
Pulse( 5, 3, 2, 4)=0000000000000000222222222222222222222222222222222
Pulse( 5, 3, 2, 5)=0000000000000000222222222222222222222222222222222
Pulse( 5, 4, 2, 2)=00000000000000002222222222222222222222222222222222
Pulse( 5, 4, 2, 3)=00000000000000002222222222222222222222222222222222
Pulse( 5, 4, 2, 4)=0000000000000000222222222222222222222222222222222
Pulse( 5, 4, 2, 5)=0000000000000000222222222222222222222222222222222
Pulse( 5, 5, 2, 2)=00000000000000002222222222222222222222222222222222
Pulse( 5, 5, 2, 3)=00000000000000002222222222222222222222222222222222
Pulse( 5, 5, 2, 4)=0000000000000000222222222222222222222222222222222
Pulse( 5, 5, 2, 5)=0000000000000000222222222222222222222222222222222
Pulse( 2, 2, 3, 2)=00000000000000000002222222222222222222222222222222222222222222
Pulse( 2, 2, 3, 3)=000000000000000000022222222222222222222222222222222222222222222

Type-3 Strategy (m-s-m-s)

Adaptive parameters, Tsfp and Telp, for $m_1$T marks in NRZI sequence of ($m_0$T) mark - ($s_0$ T) space – ($m_1$T) mark – ($s_1$ T )space.

(a) Main Table; Tsfp and Telp table for $m_0 \neq 2$ or $s_0 \neq 2$

| Tsfp | $m_1=2$ | $m_1=3$ | $m_1=4$ | $m_1 \geqq 5$ |
|---|---|---|---|---|
| $s_0=2$ | F1 | F2 | F3 | F4 |
| $s_0=3$ | F5 | F6 | F7 | F8 |
| $s_0=4$ | F9 | F10 | F11 | F12 |
| $s_0 \geqq 5$ | F13 | F14 | F15 | F16 |

| Telp | $m_1=2$ | $m_1=3$ | $m_1=4$ | $m_1 \geqq 5$ |
|---|---|---|---|---|
| $s_1=2$ | L1 | L2 | L3 | L4 |
| $s_1=3$ | L5 | L6 | L7 | L8 |
| $s_1=4$ | L9 | L10 | L11 | L12 |
| $s_1 \geqq 5$ | L13 | L14 | L15 | L16 |

(b) Sub Table; Tsfp and Telp table for $m_0=2$ and $s_0=2$.

Thermal interference compensation parameter $\Delta_{F1}$ to $\Delta_{F4}$, and $\Delta_{L1}$ to $\Delta_{L3}$ are introduced.

When $m_0=2$ and $s_0=2$,

Parameters F1 to F4 are modified as follows.

$F1 = F1 + \Delta_{F1}$
$F2 = F2 + \Delta_{F2}$
$F3 = F3 + \Delta_{F3}$
$F4 = F4 + \Delta_{F4}$ Parameters L1 to L16 are modified as follows.

$L1 = L1 + \Delta_{L1}$ (Ln+1 n=4m, m=0,1,2,3)
$L2 = L2 + \Delta_{L2}$ (Ln+2 n=4m, m=0,1,2,3)
$L3 = L3 + \Delta_{L3}$ (Ln+3 n=4m, m=0,1,2,3)
$L4 = L4 + 0$ (Ln+4 n=4m, m=0,1,2,3, are not changed for stable recording for longer marks)

....

Then, parameters are difined as follows.

| Tsfp | $m_1=2$ | $m_1=3$ | $m_1=4$ | $m_1 \geqq 5$ |
|---|---|---|---|---|
| $s_0=2$ | $F1+\Delta_{F1}$ | $F2+\Delta_{F2}$ | $F3+\Delta_{F3}$ | $F4+\Delta_{F4}$ |
| $s_0=3$ | F5 | F6 | F7 | F8 |
| $s_0=4$ | F9 | F10 | F11 | F12 |
| $s_0 \geqq 5$ | F13 | F14 | F15 | F16 |

| Telp | $m_1=2$ | $m_1=3$ | $m_1=4$ | $m_1 \geqq 5$ |
|---|---|---|---|---|
| $s_1=2$ | $L1+\Delta_{L1}$ | $L2+\Delta_{L2}$ | $L3+\Delta_{L3}$ | L4 |
| $s_1=3$ | $L5+\Delta_{L1}$ | $L6+\Delta_{L2}$ | $L7+\Delta_{L3}$ | L8 |
| $s_1=4$ | $L9+\Delta_{L1}$ | $L10+\Delta_{L2}$ | $L11+\Delta_{L3}$ | L12 |
| $s_1 \geqq 5$ | $L13+\Delta_{L1}$ | $L14+\Delta_{L2}$ | $L15+\Delta_{L3}$ | L16 |

FIG. 11

Pulse for 2T mark
Pulse( 2, 2, 2)=0022222222222222222222222222222222
Pulse( 3, 2, 2)=2222222222222222222222222222222222
Pulse( 4, 2, 2)=2222222222222222222222222222222222

Pulse( 2, 3, 2)=2222222222222222222222222222222222
Pulse( 3, 3, 2)=2222222222222222222222222222222222
Pulse( 4, 3, 2)=2222222222222222222222222222222222

Pulse( 2, 4, 2)=2222222222222222222222222222222222
Pulse( 3, 4, 2)=2222222222222222222222222222222222
Pulse( 4, 4, 2)=2222222222222222222222222222222222

Pulse for 3T mark
Pulse( 2, 2, 3)=000222222222222222222222222222222222222222
Pulse( 3, 2, 3)=022222222222222222222222222222222222222222
Pulse( 4, 2, 3)=022222222222222222222222222222222222222222

Pulse( 2, 3, 3)=002222222222222222222222222222222222222222
Pulse( 3, 3, 3)=002222222222222222222222222222222222222222
Pulse( 2, 4, 3)=022222222222222222222222222222222222222222

Pulse( 4, 3, 3)=022222222222222222222222222222222222222222
Pulse( 3, 4, 3)=022222222222222222222222222222222222222222
Pulse( 4, 4, 3)=022222222222222222222222222222222222222222

Pulse for 4T mark
Pulse( 2, 2, 4)=0002222222222222222222222222222222222222222222222222
Pulse( 3, 2, 4)=0222222222222222222222222222222222222222222222222222
Pulse( 4, 2, 4)=0222222222222222222222222222222222222222222222222222

Pulse( 2, 3, 4)=0022222222222222222222222222222222222222222222222222
Pulse( 3, 3, 4)=0222222222222222222222222222222222222222222222222222
Pulse( 4, 3, 4)=0222222222222222222222222222222222222222222222222222

Pulse( 2, 4, 4)=0222222222222222222222222222222222222222222222222222
Pulse( 3, 4, 4)=0222222222222222222222222222222222222222222222222222
Pulse( 4, 4, 4)=0222222222222222222222222222222222222222222222222222

FIG. 12

Type-4 Strategy (m-s-m)

Adaptive parameters, Tsfp and Telp, for $m_1$T marks in NRZI sequence of ($m_0$T) mark - ($s_0$ T) space - ($m_1$T) mark.

Main Table; Tsfp and Telp table for $m_0 \geqq 3$

| Tsfp | $m_1=2$ | $m_1=3$ | $m_1 \geqq 4$ |
|---|---|---|---|
| $s_0=2$ | F1 | F2 | F3 |
| $s_0=3$ | F4 | F5 | F6 |
| $s_0 \geqq 4$ | F7 | F8 | F9 |

| Telp | $m_1=2$ | $m_1=3$ | $m_1 \geqq 4$ |
|---|---|---|---|
| $s_0=2$ | L1 | L2 | L3 |
| $s_0=3$ | L4 | L5 | L6 |
| $s_0 \geqq 4$ | L7 | L8 | L9 |

Sub Table; Tsfp and Telp table for $m_0=2$

| Tsfp | $m_1=2$ | $m_1=3$ | $m_1 \geqq 4$ |
|---|---|---|---|
| $s_0=2$ | F'1 | F'2 | F'3 |
| $s_0=3$ | F'4 | F'5 | F'6 |
| $s_0 \geqq 4$ | F'7 | F'8 | F'9 |

| Telp | $m_1=2$ | $m_1=3$ | $m_1 \geqq 4$ |
|---|---|---|---|
| $s_0=2$ | L'1 | L'2 | L'3 |
| $s_0=3$ | L'4 | L'5 | L'6 |
| $s_0 \geqq 4$ | L'7 | L'8 | L'9 |

*FIG. 13*

Type-5 Strategy (modified m-s-m)

Adaptive parameters, Tsfp and Telp, for $m_1T$ marks in NRZI sequence of ($m_0T$) mark - ($s_0$ T) space – ($m_1T$) mark.

Main Table; Tsfp and Telp table for $m_0 \geqq 3$

| Tsfp | $m_1=2$ | $m_1=3$ | $m_1 \geqq 4$ |
|---|---|---|---|
| $s_0=2$ | F1 | F2 | F3 |
| $s_0=3$ | F4 | F5 | F6 |
| $s_0 \geqq 4$ | F7 | F8 | F9 |

| Telp | $m_1=2$ | $m_1=3$ | $m_1 \geqq 4$ |
|---|---|---|---|
| $s_0=2$ | L1 | L2 | L3 |
| $s_0=3$ | L4 | L5 | L6 |
| $s_0 \geqq 4$ | L7 | L8 | L9 |

Sub Table; Tsfp and Telp table for $m_0=2$

Thermal interference compensation parameter $\Delta_{F1}$, $\Delta_{F2}$, $\Delta_{F3}$, $\Delta_{L1}$, and $\Delta_{L2}$ are introduced.

| Tsfp | $m_1=2$ | $m_1=3$ | $m_1 \geqq 4$ |
|---|---|---|---|
| $s_0=2$ | F1+$\Delta_{F1}$ | F2 +$\Delta_{F2}$ | F3 +$\Delta_{F3}$ |
| $s_0=3$ | F4 | F5 | F6 |
| $s_0 \geqq 4$ | F7 | F8 | F9 |

| Telp | $m_1=2$ | $m_1=3$ | $m_1 \geqq 4$ |
|---|---|---|---|
| $s_0=2$ | L1 +$\Delta_{L1}$ | L2 +$\Delta_{L2}$ | L3 |
| $s_0=3$ | L4 +$\Delta_{L1}$ | L5 +$\Delta_{L2}$ | L6 |
| $s_0 \geqq 4$ | L7 +$\Delta_{L1}$ | L8 +$\Delta_{L2}$ | L9 |

FIG. 14

Type-6 Strategy (modified m-s-m)

Adaptive parameters, Tsfp and Telp, for $m_1$T marks in NRZI sequence of ($m_0$T) mark - ($s_0$ T) space – ($m_1$T) mark.

Main Table; Tsfp and Telp table for $m_0 \geqq 3$

| Tsfp | $m_1=2$ | $m_1=3$ | $m_1 \geqq 4$ |
|---|---|---|---|
| $s_0=2$ | F1 | F2 | F3 |
| $s_0=3$ | F4 | F5 | F6 |
| $s_0 \geqq 4$ | F7 | F8 | F9 |

| Telp | $m_1=2$ | $m_1=3$ | $m_1 \geqq 4$ |
|---|---|---|---|
| $s_0=2$ | L1 | L2 | L3 |
| $s_0=3$ | | | |
| $s_0 \geqq 4$ | | | |

Sub Table; Tsfp and Telp table for $m_0=2$

Thermal interference compensation parameters $\Delta_{F1}$, $\Delta_{F2}$, $\Delta_{F3}$, $\Delta_{L1}$, and $\Delta_{L2}$ are introduced.

| Tsfp | $m_1=2$ | $m_1=3$ | $m_1 \geqq 4$ |
|---|---|---|---|
| $s_0=2$ | F1+$\Delta_{F1}$ | F2 +$\Delta_{F2}$ | F3 +$\Delta_{F3}$ |
| $s_0=3$ | F4 | F5 | F6 |
| $s_0 \geqq 4$ | F7 | F8 | F9 |

| Telp | $m_1=2$ | $m_1=3$ | $m_1 \geqq 4$ |
|---|---|---|---|
| $s_0=2$ | L1 +$\Delta_{L1}$ | L2 +$\Delta_{L2}$ | L3 |
| $s_0=3$ | | | |
| $s_0 \geqq 4$ | | | |

Limit equalizer jitter at 1X read speed as function of write speed

FIG. 15B

| Write Strategy | Description | Number of Table Parameters | Remarks |
|---|---|---|---|
| Conventional | Tsfp(s,m) and Telp(s,m)<br>4x4 | 32 | 16 for Tsfp and Telp |
| Type-1 | Full (m-s-m-s)<br>4x4 | 320 | 64 for Tsfp<br>256 for Telp |
| Type-2 | Modified (m-s-m-s)<br>4x4x2 | 52 | 16 for Tsfp and Telp<br>x 2 case with overlap |
| Type-3 | Modified (m-s-m-s)<br>4x4 | 39 | 16 for Tsfp and Telp<br>7 for ⊿ |
| Type-4 | Modified (m-s-m)<br>3x3x2 | 36 | 9 for Tsfp and Telp<br>x 2 case |
| Type-5 | Modified (m-s-m)<br>3x3 | 23 | 9 for Tsfp and Telp<br>5 for ⊿ |
| Type-6 | Modified (m-s-m)<br>Tsfp 3x3, Telp 3 | 17 | 9 for Tsfp, 3 for Telp<br>5 for ⊿ |

Recording Parameter Calibration Sequence

RECORDING METHOD AND OPTICAL DISK APPARATUS USING THE METHOD

CLAIM OF PRIORITY

The present application claims priority from Japanese application JP 2006-287886 filed on Oct. 23, 2006, the content of which is hereby incorporated by reference into this application.

BACKGROUND OF THE INVENTION

1. Field of the Invention

The present invention relates to an optical disk recording method, a laser driving apparatus, and an optical disk apparatus for recording information by forming a recording mark on a recording medium whose physical properties are different from those of the other portions of the medium.

2. Description of the Related Art

There are various kinds of recordable optical disk media such as CD-R/RW, DVD-RAM, DVD±R/RW, Blu-ray Disc (hereinafter referred to as BD), HD DVD, and these media including one having two recording layers are in widespread use. Optical disk apparatuses supporting these media include the so-called DVD super multi-drive in widespread use which supports the recording/reproducing of CD-R/RW, DVD-RAM, and DVD±R/RW. It is expected that an ultimate super multi-drive having an additional function of supporting Bluray Disc and HD DVD will be developed.

In optical disk apparatuses, there is also an important technical problem of enhancing the recording speed. Nowadays, 52× CD, 16× DVD, and 2.4× BD drives are commercially produced. It is expected that a high-speed recording technology of BD and HD DVD will be a major technical problem in this field.

In conventional optical disks, recording marks are formed by intensity-modulated laser pulse trains, and there is mainly used a write strategy for compensating a start timing and an end timing of a laser pulse train in accordance with a recording mark length and the preceding and following space lengths. FIG. 2A shows a write strategy for 4.7 GB DVD-RAM shown in FIG. 1 of Japanese Unexamined Patent Application Publication No. 2003-187443. As shown in FIG. 2A, one recording mark is formed using a pulse train composed of a first pulse, an intermediate pulse, a last pulse, and a cooling pulse. There are used a total of four power values which are a power level for recording (peak power), a power level for erasing (bias power 1), a power level of the cooling pulse (bias power 2), and a power level of the bottom of the intermediate pulse (bias power 3).

As shown in FIG. 2B, a start timing Tsfp of a first pulse is determined in accordance with the preceding space length so and a recording mark length $m_1$. An end timing Telp of a last pulse is determined in accordance with the recording mark length $m_1$ and the following space length $s_1$. These timings are called a 4×4 table-type strategy due to four divided mark lengths and space lengths. Further, Japanese Unexamined Patent Application Publication No. 5-234079 discloses a table-type write strategy that responds to further preceding mark lengths.

As for the high-speed recording technology of a BD write-once disk, Jpn. J. Appl. Phys. Vol. 45, (2006) pp. 1213-1218 reports the result of 12× recording/reproducing, which is the current maximum speed. It reports that basically a 4×4 table-type strategy has been used as the write strategy. Further, Proc. IOSM/ODS '05, TuP26, (2005) reports the recording result of 8× BD, which is the experiment result of high-speed recording next to the former.

SUMMARY OF THE INVENTION

The shortest recording mark length of BD is about 150 nm (2 T) and much shorter than that of DVD which is about 400 nm (3 T). As for the film structure of an optical disk and the thermal diffusivity thereof, the thickness of a recording film is about 10 to 20 nm, and it is conceivable that BD and DVD are of approximately the same thickness of the thin-film structure including surrounding protective film and the used materials also have about the same thermal conductivity. Accordingly, it can be said that despite smaller recording mark, BD has much the same thermal diffusivity of a recording mark and its surroundings as that of DVD. For this reason, it is presumed that thermal effect (hereinafter referred to as thermal interference) from the preceding mark becomes large in high-speed recording.

Comparison will be made of the jitter values in the above-mentioned documents. According to Proc. IOSM/ODS '05, TuP26, (2005), the jitter value is about 6.5% at 4× speed and about 8% at 8× speed; therefore, the jitter value deteriorates remarkably due to the increased speed as presumed above. Other reports show a similar propensity, and the jitter value deteriorates remarkably at recording speeds in excess of 6× speed. On the other hand, according to Jpn. J. Appl. Phys. Vol. 45, (2006) pp. 1213-1218, the jitter value is about 4.9% at 1× to 9× speeds and about 5.5% at 12× speed; therefore, it does not appear that the jitter value deteriorates remarkably due to the increased speed. The latter describes a high-speed reproduction technology and an adjustment method for a write strategy in detail, but does not describe the details of the write strategy.

It is an object of the present invention to provide a recording method suitable for high-speed recording of an optical disk and an optical disk apparatus using the method, through the study of a write strategy for achieving high-speed recording of BD.

In one aspect according to the invention, a method for recording information by irradiating an optical disk medium with an intensity-modulated laser pulse to form a recording mark thereon includes the steps of obtaining information concerning a start position and an end position of the laser pulse for forming the recording mark by referring to a first table; obtaining the amount of compensation of the start position of the laser pulse and the amount of compensation of the end position by referring to a second table based on a recording mark length, a preceding space length, a further preceding mark length, and a space length following the recording mark; and generating a laser pulse that starts at a start position compensated by the amount of compensation of the start position and ends at an end position compensated by the amount of compensation of the end position.

In another aspect according to the invention, a method for recording information by irradiating an optical disk medium with an intensity-modulated laser pulse to form a recording mark thereon includes the steps of obtaining information concerning a start position and an end position of the laser pulse for forming the recording mark by referring to a first table; determining whether a combination pattern of a space length preceding the recording mark and a further preceding mark length is a pre-registered pattern; generating a laser pulse that starts at the start position and ends at the end position if the pattern is not the pre-registered pattern; obtaining the amount of compensation of the start position of the laser pulse and the amount of compensation of the end position by referring to a second table based on a recording mark length, the preceding space length, and a space length following the recording mark if the pattern is the pre-registered pattern; and generating a laser pulse that starts at a start position compensated by the amount of compensation of the start position and ends at an end position compensated by the amount of compensation of the end position. The pre-registered pattern can be a combination of a space length of the shortest space preceding the recording mark and a further preceding mark length of the shortest mark.

In still another aspect according to the invention, a method for recording information by irradiating an optical disk medium with an intensity-modulated laser pulse to form a recording mark thereon includes the steps of obtaining information concerning a start position and an end position of the laser pulse for forming the recording mark by referring to a first table based on a recording mark length and a space length preceding the recording mark; determining whether a mark length preceding the recording mark coincides with a pre-registered mark length; generating a laser pulse that starts at the start position obtained from the first table and ends at the end position if the mark length preceding the recording mark does not coincide with the pre-registered mark length; obtaining the amount of compensation of the start position of the laser pulse and the amount of compensation of the end position by referring to a second table based on the recording mark length and the space length preceding the recording mark if the mark length preceding the recording mark coincides with the pre-registered mark length; and generating a laser pulse that starts at a start position compensated by the amount of compensation of the start position and ends at an end position compensated by the amount of compensation of the end position.

In yet another aspect according to the invention, an optical disk apparatus for recording information by irradiating an optical disk medium with an intensity-modulated laser pulse to form a recording mark thereon includes a laser light source; a laser driver for generating a laser pulse by intensity-modulating the laser light source; an encoder for generating a data sequence corresponding to the recording mark and a space to be recorded on the optical disk; a recording pulse table for storing information concerning a start position and an end position of the laser pulse for forming the recording mark and information concerning the amount of compensation of the start position and the end position; and a controller for driving the laser driver by setting the start position and the end position of the laser pulse for forming the recording mark from the data sequence generated by the encoder by referring to the recording pulse table, wherein the recording pulse table includes a start position table storing the start position, with a recording mark length and a space length preceding the recording mark being parameters; an end position table storing the end position, with the recording mark length and a following space length being parameters; a start position compensation table storing the amount of compensation of the start position, with the recording mark length, the preceding space length, and a further preceding mark length being parameters; and an end position compensation table storing the amount of compensation of the end position, with the recording mark length, the preceding space length, the further preceding mark length, and the space length following the recording mark being parameters.

It is also possible to use a recording pulse table other than the above tables. For example, a second table may store information concerning the amount of compensation for compensating the start position and the end position of the laser pulse stored in the first table in the case where a combination pattern of a space length preceding the recording mark and a further preceding mark length is a pre-registered pattern. More specifically, the second table may store the amount of compensation of the start position of the laser pulse and the amount of compensation of the end position, with the recording mark length, the preceding space length, and the space length following the recording mark being parameters. In this case, the pre-registered pattern can be a combination of a space length of the shortest space preceding the recording mark and a further preceding mark length of the shortest mark.

Further, the recording pulse table may include a first table storing information concerning the start position and the end position of the laser pulse for forming the recording mark, with the recording mark length and the space length preceding the recording mark being parameters, and a second table storing information concerning the amount of compensation for compensating the start position and the end position of the laser pulse stored in the first table in the case where the mark length preceding the recording mark coincides with a pre-registered mark length; and the second table may store the amount of compensation of the start position of the laser pulse and the amount of compensation of the end position, with the recording mark length and the space length preceding the recording mark being parameters.

With the recording method according to the aspects of the invention and the optical disk apparatus using the method, it becomes possible to achieve high-speed recording of a high-density optical disk such as BD.

BRIEF DESCRIPTION OF THE DRAWINGS

Embodiments of the present invention will be described in detail based on the following figures, wherein:

FIG. 1B is an illustration showing the configuration of the parameter tables of Tsfp and Telp;

FIG. 4 is an illustration showing the major specifications of the evaluation apparatus;

FIG. 7 is an illustration showing the experimental results of 12× recording;

FIG. 8 is an illustration showing Type-1 write strategy according to the invention;

FIG. 9 is an illustration showing an example of Type-1 write strategy according to the invention;

FIG. 10 is an illustration showing Type-3 write strategy according to the invention;

FIG. 11 is an illustration showing an example of ($M_0$, $S_0$, $m_1$) type write strategy according to the invention;

FIG. 12 is an illustration showing Type-4 write strategy according to the invention;

FIG. 13 is an illustration showing Type-5 write strategy according to the invention;

FIG. 14 is an illustration showing Type-6 write strategy according to the invention;

FIG. 15B is an illustration summarizing the number of table parameters of the strategies;

DESCRIPTION OF THE PREFERRED EMBODIMENTS

Figure 2A:
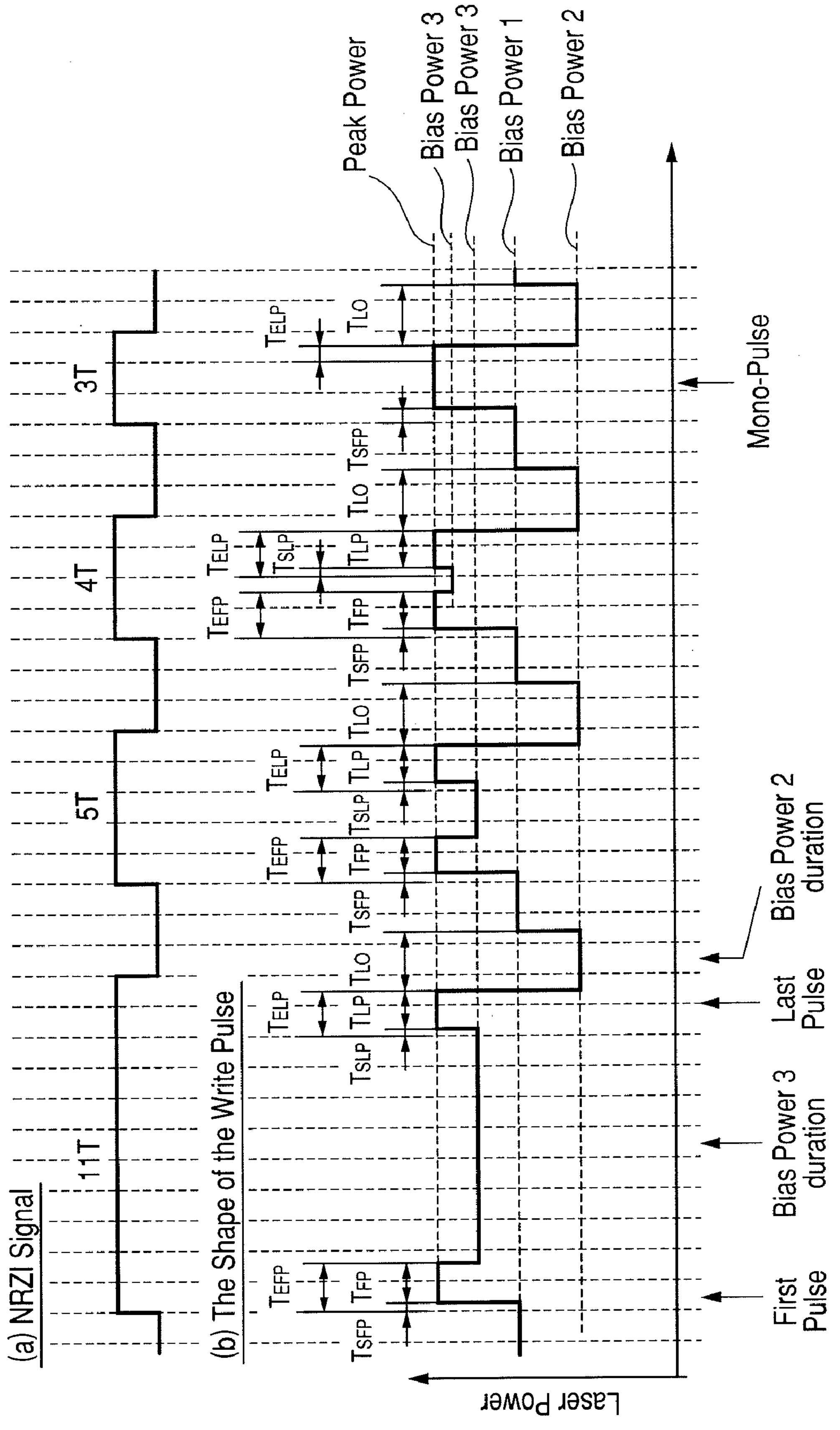
FIG. 2A is a known example showing write pulses of DVD-RAM.
Figures 2B, 3:
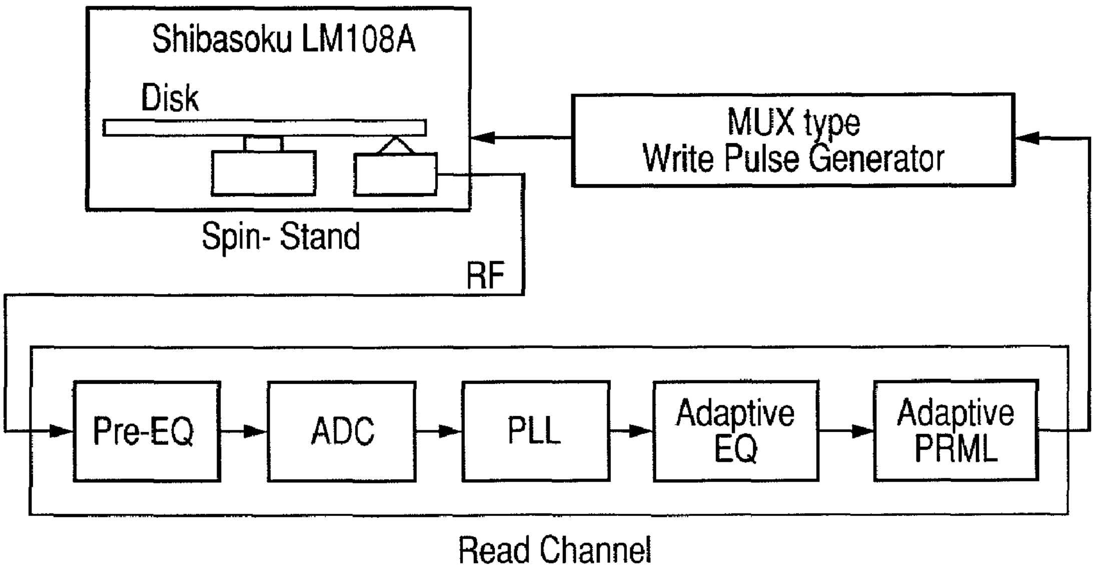
FIG. 2B is an illustration showing the configuration of the parameter tables of Tsfp and Telp.
FIG. 3 is a block diagram of an evaluation apparatus.

Jpn. J. Appl. Phys. Vol. 45, (2006) pp. 1213-1218 does not describe the details of the write strategy except that basically a 4×4 table-type write strategy has been used, and thus does not give any reason for little deterioration of the jitter value with increased speed. For this reason, a 12× recording experiment has been carried out with a 4×4 table-type write strategy. FIG. 3 shows the configuration of an experimental apparatus, and FIG. 4 shows the major specifications thereof. The entire apparatus is configured with a spin-stand, a write pulse generator, and a read signal processor. An optical head has a wavelength of 405 nm and an NA of 0.85. The write pulse generator used is a multiplexer (MUX) type pulser having a maximum frequency of 12.8 GHz. The read signal processor has a function of adaptive Viterbi decoding as well as being capable of measuring jitter at a limit equalizer. The used medium is a phase-change write-once disk.

This recording film has high sensitivity and a high S/N ratio and makes it possible to perform 12× recording at a recording power of 10 mW or less.

Figure 5:
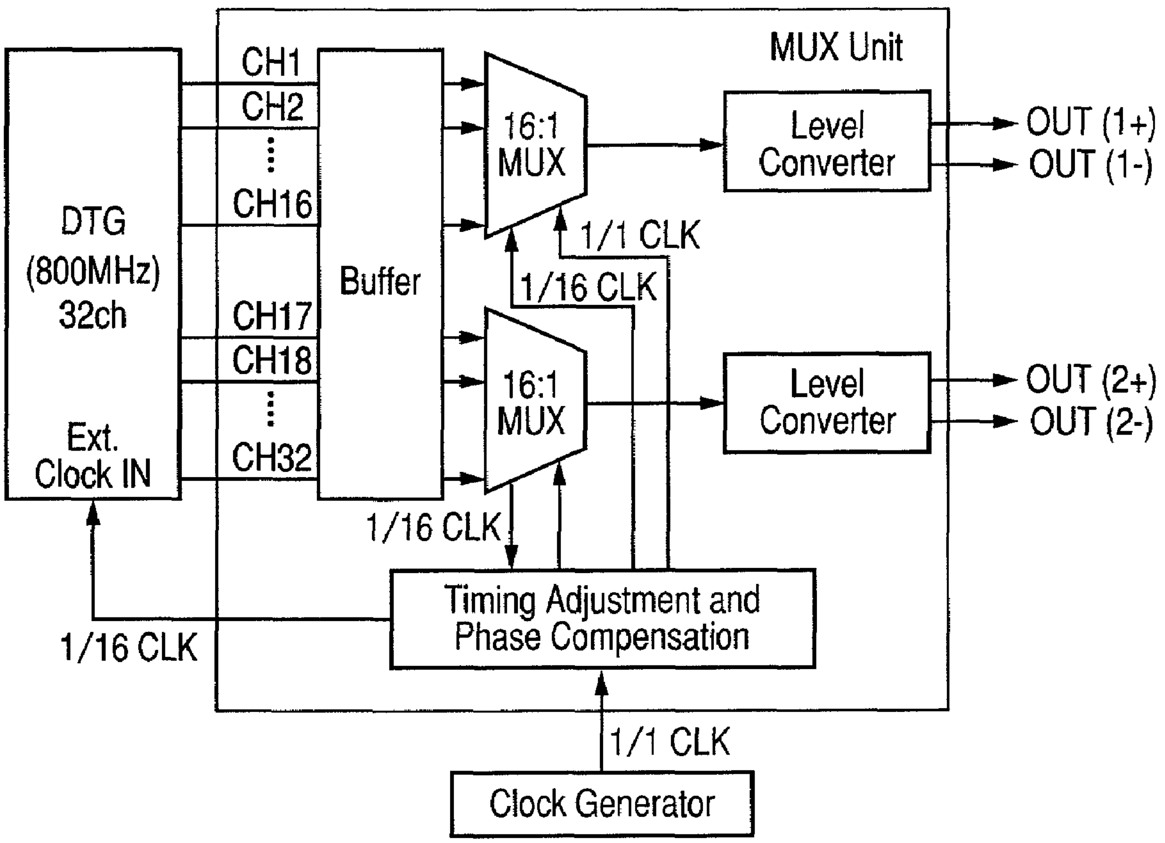
FIG. 5 is a block diagram of a MUX-type write pulse generator.

FIG. 5 shows the configuration of the MUX-type write pulse generator. Two 16:1 MUX chips converts 32-channel output data from a parallel data generator (DTG) into 2-channel 12.8-GHz laser switch control signals. As for the MUX chip, a special device without incorporating a PLL (phase locked loop) circuit is selected from among optical communication devices. The reason for this is to change the frequency of an external clock to make the recording speed variable. The recording speed ranges from 1× to 12× BD in the case of controlling the recording pulse width by dividing 1 T (T: clock period) into 16 portions. The DTG which retains the shape data of a recoding pulse can set an arbitrary recording pulse shape by using a dedicated control program. Further, a user data sequence to be recorded can be selected in conformity with the formats of DVD, DVD-RAM, HD DVD and BD, and a special pattern and a repetitive pattern for a trial write can be created. By using such devices, it is possible to examine the performance of various write strategies described later as well as the above-described 4×4 table-type write strategy.

Figure 6:
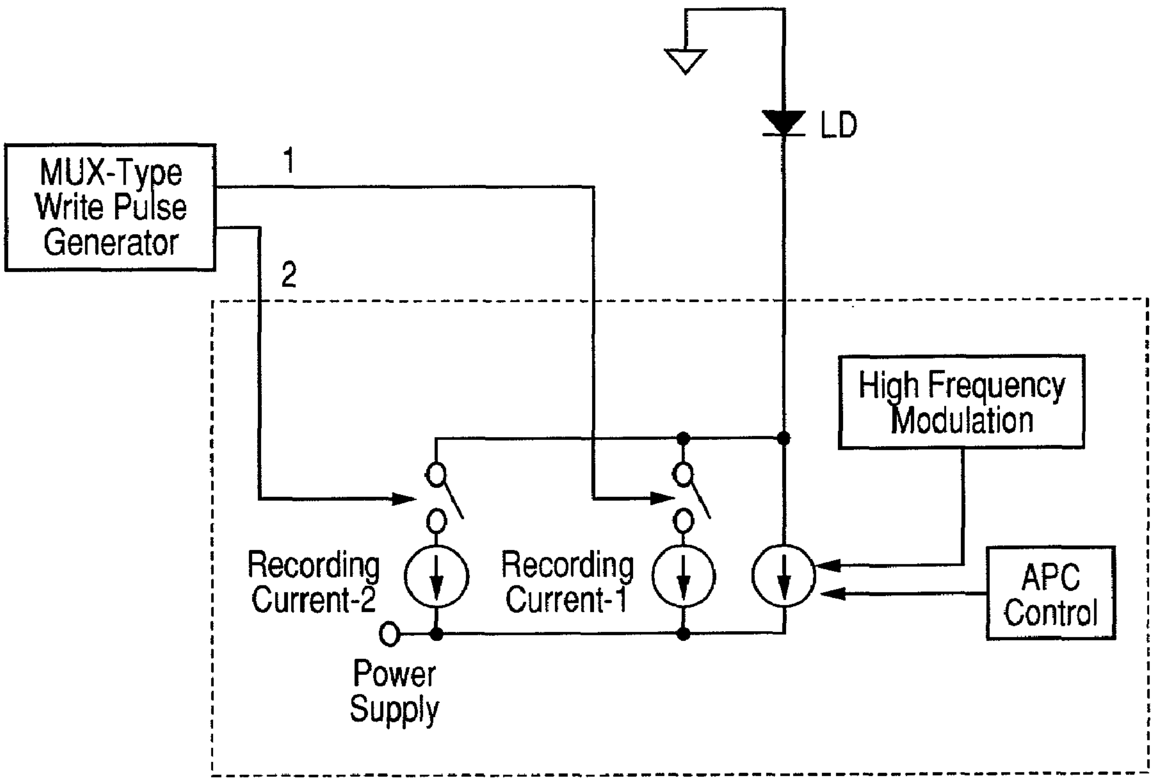
FIG. 6 is a block diagram of a laser driver circuit.

FIG. 6 schematically shows the configuration of a laser driver. The 2-channel control signals of the MUX-type write pulse generator are connected to respective laser current sources in a differential ECL manner, thereby enabling the emission of an arbitrary laser pulse at three power levels. The rise time of the laser driver is 0.7 ns. Since 1 T is about 1.2 ns in the case of 12× recording, it is difficult to perform high-speed recording with a write strategy using a multi-pulse of a 0.5 T width. For this reason, the experiment has been carried out with the so-called mono-pulse type write strategy which can make each pulse width wider. This is the same selection as in Jpn. J. Appl. Phys. Vol. 45, (2006) pp. 1213-1218.

FIG. 7 is an illustration showing an example of the experimental results of 12× recording. The recording power is 6.6 mW, and the reproducing power is 0.3 mW. In the case of using a conventional 4×4 table-type write strategy, a jitter value after equalized by the limit equalizer during 1× reproduction is as large as 12.8%. In particular, as seen in jitter measurement results in FIG. 7, the wide spread distribution of the pattern containing the preceding space 2 T and mark 2 T (shown as TSFP (2, 2) in FIG. 7) is remarkable, and an edge position appears to be split in two. This is also clear from large fluctuations in 2 T mark level as seen in the extracted signal of "2 T mark-2 T space-2 T mark" (2 m-2 s-2 m) in FIG. 7. For this reason, the switching of compensation parameters in the case where the preceding pattern $(m_0, s_0)$=(2 T, 2 T) and in the other cases has been tested. Here, $m_0$ denotes the preceding mark length, so denotes the preceding space length, $m_1$ denotes the recording mark length, and $s_1$ denotes the following space length. The result is shown as the preceding pattern compensation 4×4 table-type strategy in FIG. 7. The jitter value is greatly improved to 5.6%. The repetitive pattern containing the shortest mark and the shortest space maximizes the thermal interference between adjacent marks. Accordingly, if this pattern continues, it can be considered that excess heat is accumulated in a data track, thus shifting the edge position of the following mark. Therefore, it can be considered that compensating only this pattern enhances the suppression effect on the edge position split seen in the jitter measurement results.

In order to further enhance the recording performance, a pattern such as "3 T mark-2 T space" which causes the next largest heat accumulation may be extracted for compensation. Although the number of parameters becomes very large, it is obvious that use of a write strategy capable of setting appropriate values for all of general $(m_0, s_0, m_1, s_1)$ type pattern tables further enhances the recording performance.

FIG. 8 shows the configuration of the parameter tables of $(m_0, s_0, m_1, s_1)$ type write strategy. Compensation parameters Δ are in four 4×4 tables for the start position of a light pulse and in sixteen 4×4 tables for the end position of a light pulse. The use thereof favorably enables high-speed recording of BD. This is referred to as Type-1 strategy.

FIG. 9 is a list showing a part of the Type-1 strategy. Pulse $(m_0, s_0, m_1, s_1)$ represents the above-mentioned $(m_0, s_0, m_1, s_1)$ type strategy. The resolution of a pulse width is T/16. In FIG. 9, numeral "0" denotes are producing power level, and numeral "2" denotes a recording power level. For example, 16 consecutive 2 s signify a 1 T recording pulse. This list shows the data format of control software for transferring pulse waveform data to the DTG of the MUX-type write pulse generator, just as it is. The total number of parameters of the write strategy shown in FIG. 9 is 320 and much larger than that of the conventional 4×4 table-type strategy which is 32. However, as for the recording performance, a further jitter reduction of about 0.2% can be achieved as described later.

The strategy is a universal type capable of performing fine-grained control in accordance with a recording pattern and has very excellent recording performance with up to 12× BD, whose experimental results are described later. This experiment has been carried out with a phase-change write-once disk. However, it is also possible to control, for example, an optical disk which records by the reaction of two kinds of inorganic materials and an optical disk using an organic dye in accordance with the respective characteristics. For example, the thickness of the recording film of the optical disk using an organic dye is as thick as about 100 nm (the thickness of the phase-change recording film is about 10 nm), and it can be considered that the thermal diffusivity of the recording material is small; therefore, according to the inventor's experience, a nonlinear element such as heat accumulation is relatively large. In such a case, this strategy offers outstanding control performance.

Figure 1A:
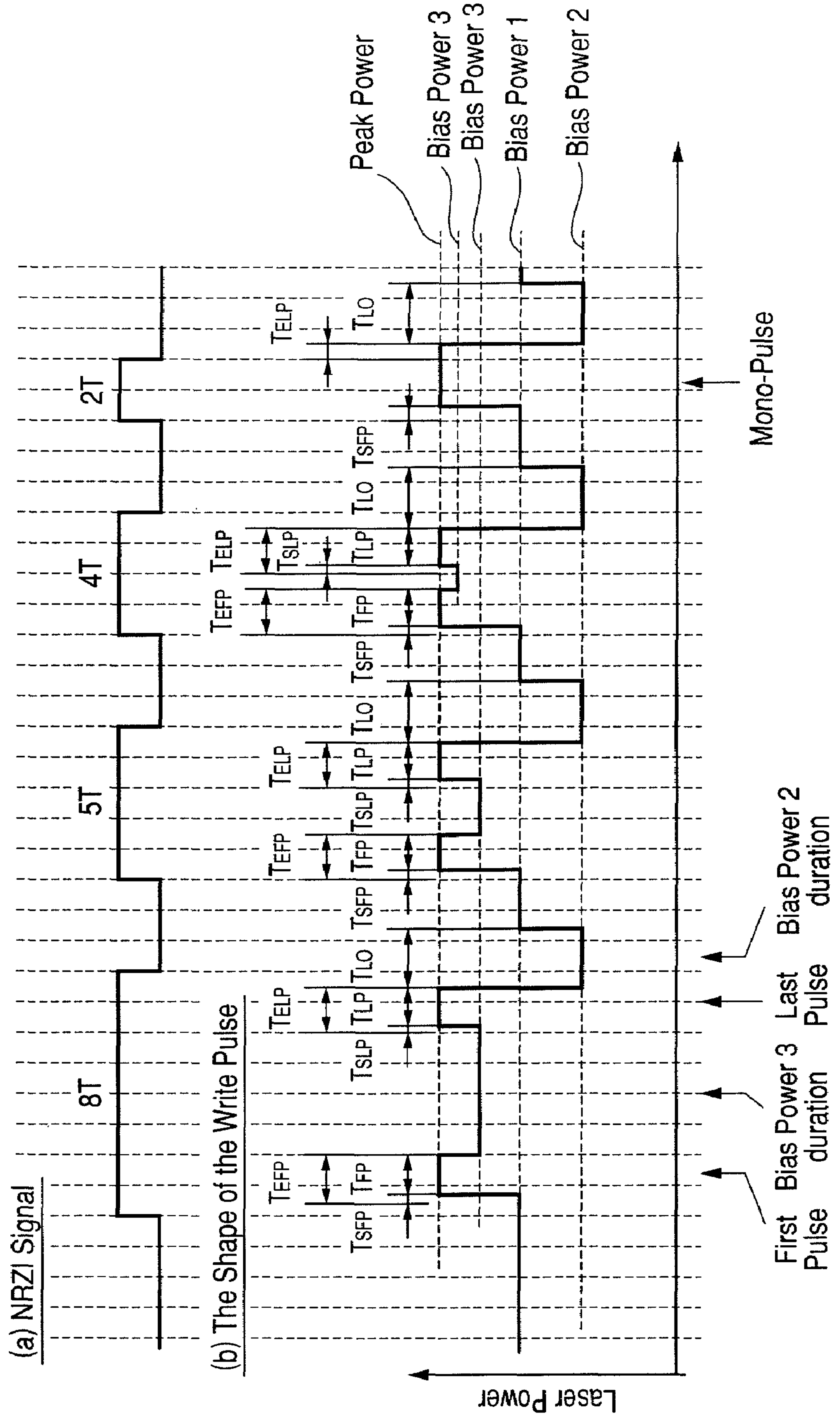
FIG. 1A is an illustration showing Type-2 write strategy according to the present invention.

FIGS. 1A and 1B show a write strategy for compensate a recording pulse in the case where the repetitive pattern containing the smallest mark and the smallest space precedes. FIG. 1A shows pulse shapes of a write strategy of generalized four power levels. The recording pulse is composed of a first pulse, an intermediate pulse (emission duration of bias power 3 in FIG. 1A), a last pulse, and a cooling pulse (emission duration of bias power 2). The start position Tsfp of the first pulse and the end position Telp of the last pulse are defined as parameter tables in accordance with a recording pattern. FIG. 1B shows the configuration of the parameter tables of Tsfp and Telp. As described above, it is characterized by the use of a sub-table when both the preceding mark length and the preceding space length are the smallest run length (2 T in this case). Even though the total number of pulse parameters is 52 which are greatly simplified compared to the Type-1 strategy, an equivalent jitter value has been obtained as described later. This is referred to as Type-2 strategy. The Type-2 strategy is characterized in that the number of parameters is reduced so that the determination operation and the learning time of the drive unit decrease. This is effective in the case where the thermal interference of a special pattern (repetitive pattern containing a 2 T mark and a 2 T space) is large during high-speed recording and the mark edge shift is also large. As described above, if the effect of the thermal interference cannot be suppressed depending on the properties of the recording film, a compensation table may be added, for example when a pattern such as "3 T mark-2 T space" precedes. This can be determined by a technique for evaluating data recorded by separating the edge shift of such a special pattern as shown in FIG. 7.

As described, by the write strategy for shifting the start position and the end position of the recording pulse in accordance with the preceding mark length $m_0$, the preceding space length $s_0$, the recording mark length $m_1$, and the following space length $s_1$, an excellent jitter value has been obtained even with 12× BD. Further, not only in Type-1 strategy which supports all combinations of $(m_0, s_0, m_1, s_1)$ but also in Type-2 strategy which operates separating the case where the preceding pattern contains the shortest mark length and the shortest space length from the other cases, an excellent jitter value has been obtained. Furthermore, depending on the properties of the recording film, similar compensation is also effective for a pattern such as "3 T mark-2 T space", as described above.

FIG. 10 is an illustration showing a modification of the write strategy according to the invention. With $(m_0, s_0, m_1, s_1)$ type write strategy, in the case where the preceding pattern $(m_0, s_0)$=(2 T, 2 T), the amount of compensation of the end timing Telp of the recording pulse is fixed for each mark length, and the amount of compensation is zero further in the case of the recording mark of 5 T or more, thereby reducing the number of parameters compared to that of Type-2 strategy. This is referred to as Type-3 strategy. In Type-2 strategy, the number of parameters of the last pulse in the sub-table is 16; however, the amount of compensation can be an approximately fixed value for each mark length from the experimental results. For example, in FIG. 9, Pulse (2, 2, 2, 3), Pulse (2, 2, 2, 4), and Pulse (2, 2, 2, 5) are the same pulse and depend little on the following space length. The use thereof can simplify the Telp sub-table of Type-2 strategy. Such a Type-3 pulse is effective for an optical disk with a recording film of a small edge shift of each mark by the following space length of the recording mark. As described above, if the number of recording parameters becomes smaller, it is possible to simplify the learning process of the drive and reduce the size of the circuitry. The recording performance differences among the strategies will be shown later as summarized experimental results.

FIG. 11 is an illustration showing an example in which Type-1 strategy according to the invention is simplified to $(m_0, s_0, m_1)$ type. Further, by defining the end timing Telp of the recording pulse as a function of the preceding space length and the recording mark length, it becomes possible to achieve a significant simplification. In the invention, since the write strategy is based on DVD-RAM, relation with the following space is used to control the position of the trailing edge of the recording mark. However, the standard-speed write strategy of DVD-R or BD is the $(m_0, s_0, m_1)$ type. Therefore, it is preferable to normally evolve the standard-speed write strategy in order to enhance the speed of BD. Embodiments of the $(m_0, s_0, m_1)$ type strategy will be described below.

FIG. 12 is an illustration showing another modification of the write strategy according to the invention. This is an embodiment of Type-2 strategy in $(m_0, s_0, m_1)$ type strategy and is characterized by separating the case where the preceding mark length $m_0$ is 2 T from the other cases. This is referred to as Type-4 strategy. This compensates the recording pulse when the repetitive pattern containing the shortest mark and the shortest space precedes (precede??). The effect and performance thereof may be considered to be the same as those of Type-2. The experimental results will be described later.

FIG. 13 is an illustration showing another modification of the write strategy according to the invention. This is an embodiment of Type-3 strategy in $(m_0, s_0, m_1)$ type strategy and is characterized by simplifying parameters by separating the case where the preceding mark length $m_0$ is 2 T from the other cases and making the amount of compensation of Telp constant for each mark length. This is referred to as Type-5 strategy. This is simplification of a recording film in which the position of the trailing edge of the recording mark depends little on the preceding space length. The effect and performance thereof may be considered to be the same as those of Type-3. The experimental results will be described later.

FIG. 14 is an illustration showing another modification of the write strategy according to the invention. This supports the case where each Telp value in the main table is fixed for each mark length in $(m_0, s_0, m_1)$ type strategy. This is referred to as Type-6 strategy. The $(m_0, s_0, m_1, s_1)$ type strategy corresponding thereto has not been described. For example, since an optical disk that records by the reaction of two kinds of inorganic materials and an optical disk that uses an organic dye basically form a recording mark by an irreversible reaction, the leading edge of the recording mark is greatly affected by the thermal interference of the preceding pattern; however, it can be considered that the effect of the thermal interference becomes smaller once the reaction starts in the mark. Therefore, it can be considered that the trailing edge of the recording mark in an optical disk having such a recording film is basically determined only by the length of the mark. Further, in an optical disk having a phase-change recording film, called a crystal growth type or a eutectic type, the trailing edge of the mark is determined in shape by a cooling process after the application of the last pulse; therefore, the effect of the thermal interference is small. This is obvious by seeing the write strategy of a rewritable disk such as DVD±RW and BD-RE. It can be considered that the above-described optical disks can provide excellent recording performance if the thermal interference of the preceding pattern can be sufficiently suppressed with the Type-6 strategy. Further, in $(m_0, s_0, m_1,$ $s_1$) type strategy as well, it is possible to easily construct the Type-6 strategy; therefore, a specific description thereof is omitted here.

Figure 15A:
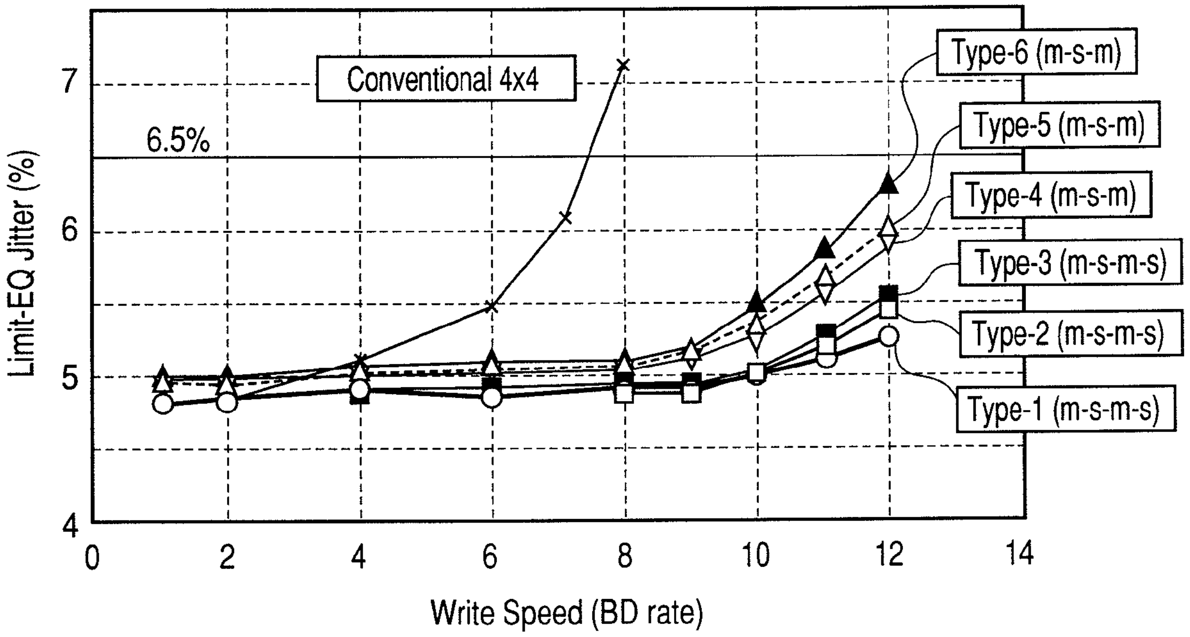
FIG. 15A is an illustration showing the recording jitter values of the strategies.

With the write strategies of Type-1 to Type-6 according to the invention, the recording experiments at 1× to 12× speeds have been carried out using the BD write-once disk. FIGS. 15A and 15B show the results. In the recording experiments, with reference to Type-2 strategy, the recording power and pulse are adjusted at each recording speed. For the other strategies, the same recording power is used and only the recording pulse condition is adjusted. FIG. 15A shows the recording jitter values of the strategies. The reproduction is evaluated using the limit equalizer at 1× speed. As shown in FIG. 15A, it has been confirmed that the jitter values at 6× speed or higher are greatly improved with all the strategies of Type-1 to Type-6 according to the invention, compared to the conventional 4×4 type strategy. In the case of a target jitter value of 6.5% or less at 12× speed, simplification down to Type-6 strategy is close to the limit. FIG. 15B summarizes the number of table parameters of the strategies. The number of parameters of Type-1 strategy is as extremely large as 320. However, with the write strategies of Type-2 to Type-6, it has been found out that excellent recording can be achieved with the number of parameters smaller than double the number (32) of parameters of the conventional 4×4 table-type write strategy.

Thus, it has become possible to provide a recording method suitable for high-speed recording of an optical disk and an optical disk apparatus using the method. Further, it is needless to say that the invention is effective to achieve high-speed recording in a high-density optical disk such as HD DVD etc.

Figure 16:
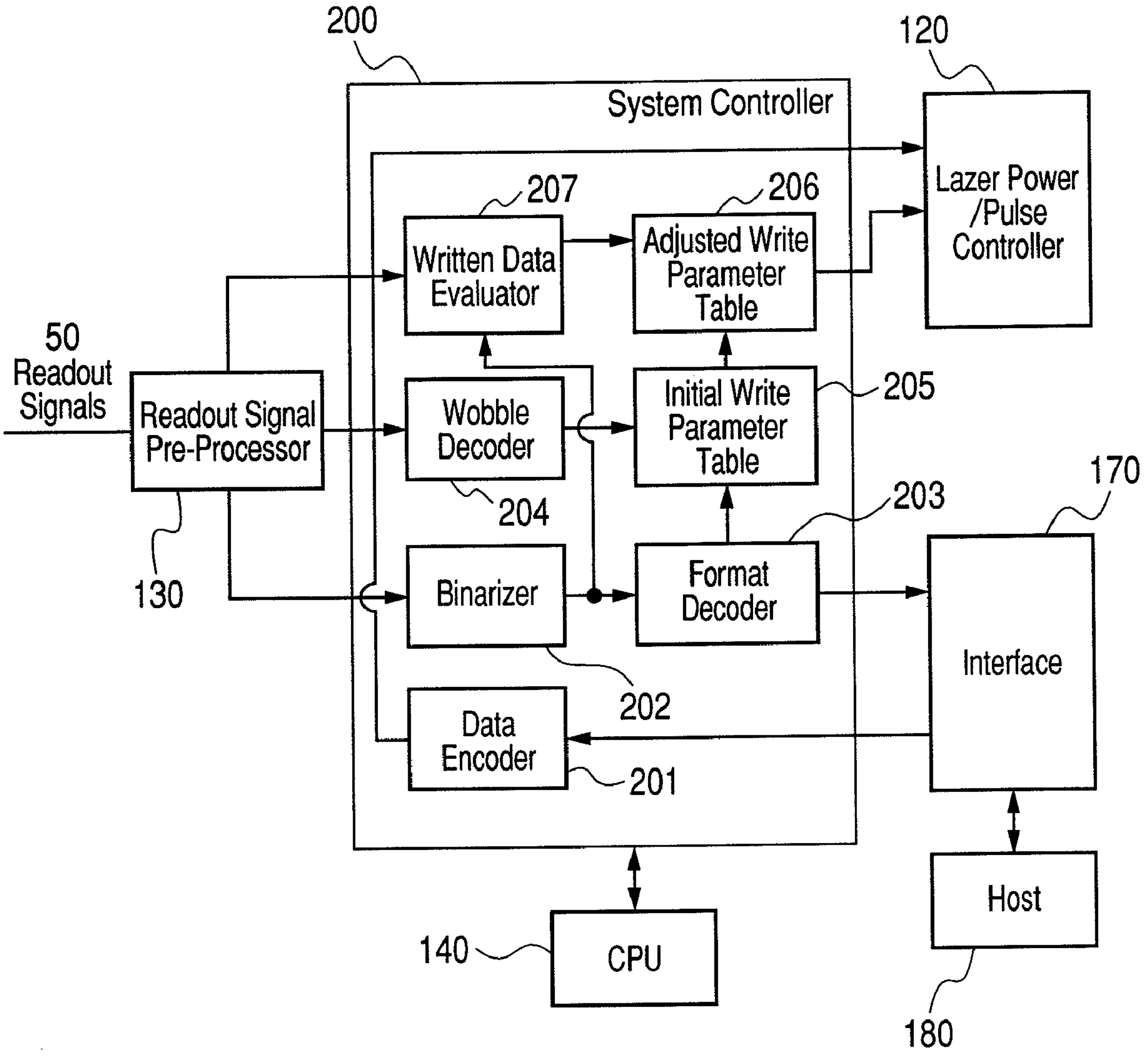
FIG. 16 is a block diagram of a recording/reproducing system controller according to the invention.

FIG. 16 is a schematic block diagram of a recording/reproducing system controller suitable for an optical disk apparatus according to the invention. In FIG. 16, a recording/reproducing system controller 200 includes a data encoder 201, a read signal binarizer 202, a format decoder 203, a wobble data decoder 204, an initial write parameter table 205, an adjusted write parameter table 206, and a written data quality evaluator 207. A data signal and a wobble signal 50 read out by an optical head (not shown) are inputted to a readout signal pre-processor 130, and subjected to filtering, equalizing, gain/offset compensation, and the like. Thereafter, the data signal is sent to the read signal binarizer 202. The read signal binarizer 202 binarizes the data signal by Viterbi decoding or direct slicing, and the resulting data is sent to the format decoder 203. The format decoder 203 performs sync detection, sector detection, code data demodulation, error correction, and the like in conformity with the disk format, and user data generated by reproducing the data is transferred to a host computer 180 through an interface 170. This is the flow of data reproduction.

On the other hand, during data recording, the format decoder 203 and the wobble data decoder 204 read out information such as recording powers and pulse parameters from the specific area of a disk called control data, and the resulting data is stored in the initial write parameter table 205. The data in the initial write parameter table 205 is copied as an initial value to the adjusted write parameter table 206 which is a work area, and a semiconductor laser incorporated in the optical head (not shown) is pulse-driven through a laser power/pulse controller 120 in accordance with the contents of data, thus performing data recording. At this time, the data encoder 201 functions to generate a data sequence to be recorded on the disk. The written data quality evaluator 207 functions to reproduce trial-recorded data and evaluate the data at the time of a trial write or the adjustment of recoding parameters called OPC (Optimum Power Control). More specifically, it can evaluate a bit error rate, jitter, asymmetry, a signal modulation degree, and the like in conformity with the type and format of the disk. The recoding parameters optimized as a result of such a trial write or OPC are finally stored in the adjusted write parameter table 206. When a recording instruction is issued from the host computer through the interface 170, the encoder 201 generates a data sequence in conformity with the data, and the laser power/pulse controller 120 controls the emission of a recording pulse in accordance therewith.

Figure 17:
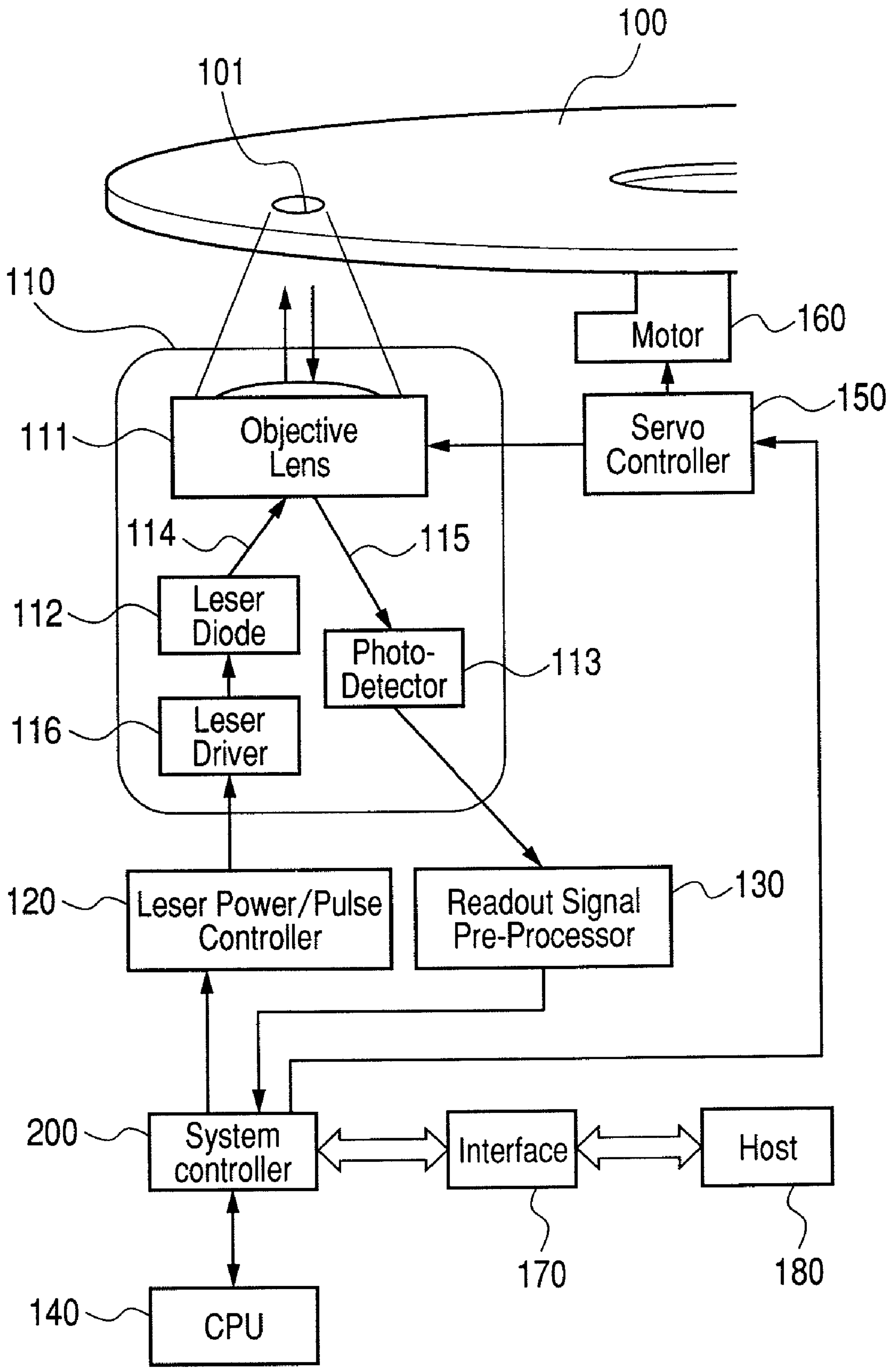
FIG. 17 is a schematic view showing a configuration example of an optical disk apparatus according to the invention.

FIG. 17 is a schematic view showing a configuration example of the optical disk apparatus according to the invention. An optical disk medium 100 is rotated by a motor 160. During reproduction, the laser power/pulse controller 120 controls current flowing through a semiconductor laser 112 via a laser driver 116 in an optical head 110 so as to obtain light intensity specified by a CPU 140 to generate laser light 114. The laser light 114 is condensed by an objective lens 111, thus forming alight spot 101 on the optical disk medium 100. Reflected light 115 from the light spot 101 is detected by a photo-detector 113 through the objective lens 111. The photo-detector is composed of multiple divided photo detection elements. The readout signal pre-processor 130 reproduces information recorded on the optical disk medium 100, using signals detected by the optical head 110.

During recording, the laser power/pulse controller 120 converts specified recording data into specified recording pulse current and sends an instruction signal to the laser driver 116 to perform control so that the semiconductor laser 112 emits pulse light. The recording/reproducing system controller 200 is mounted as one of the major components of the apparatus. The control of the operation of each component is performed by a control program in the CPU 140 through the recording/reproducing system controller 200. Such a configuration makes it possible to provide the optical disk apparatus of the invention. The strategies of Type-1 to Type-6 according to the invention are implemented by the laser driver 116 under the control of the CPU.

Figure 18:
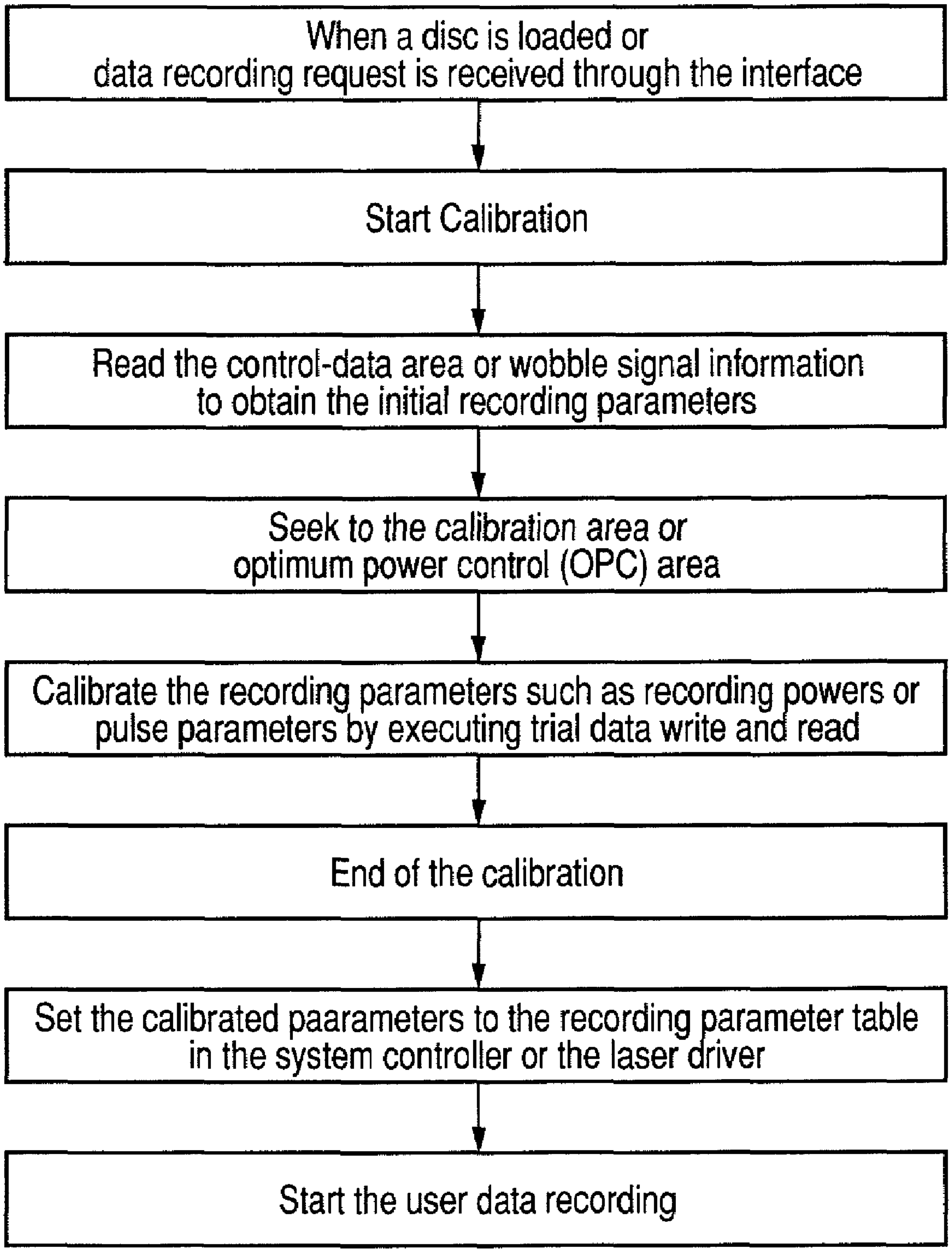
FIG. 18 is an illustration showing an example of a recording condition calibration sequence according to the invention.

FIG. 18 shows an example of the trial writing sequence for adjusting recording powers and pulse parameters, using the optical disk apparatus according to the invention. Trial writing is performed at the time of disclosing or when a data recording instruction is issued from the host computer. First, the apparatus reads initial recording parameters recorded as control data or wobble signals. Next, the apparatus seeks a trial-write area to record data while changing powers or pulse parameters, and determines favorable recording parameters by reproducing the data. There are many proposals for the specific technique of trial writing which is well known; therefore, a detailed description thereof is omitted here. After the completion of the trial writing, the apparatus sets the determined recording parameters in the recording/reproducing system controller or the like and thereby can start recording user data.

The above-described adjustment of recording parameters can be implemented by using the optical disk apparatus according to the invention shown in FIGS. 16 and 17 and the structure thereof.

Figure 19:
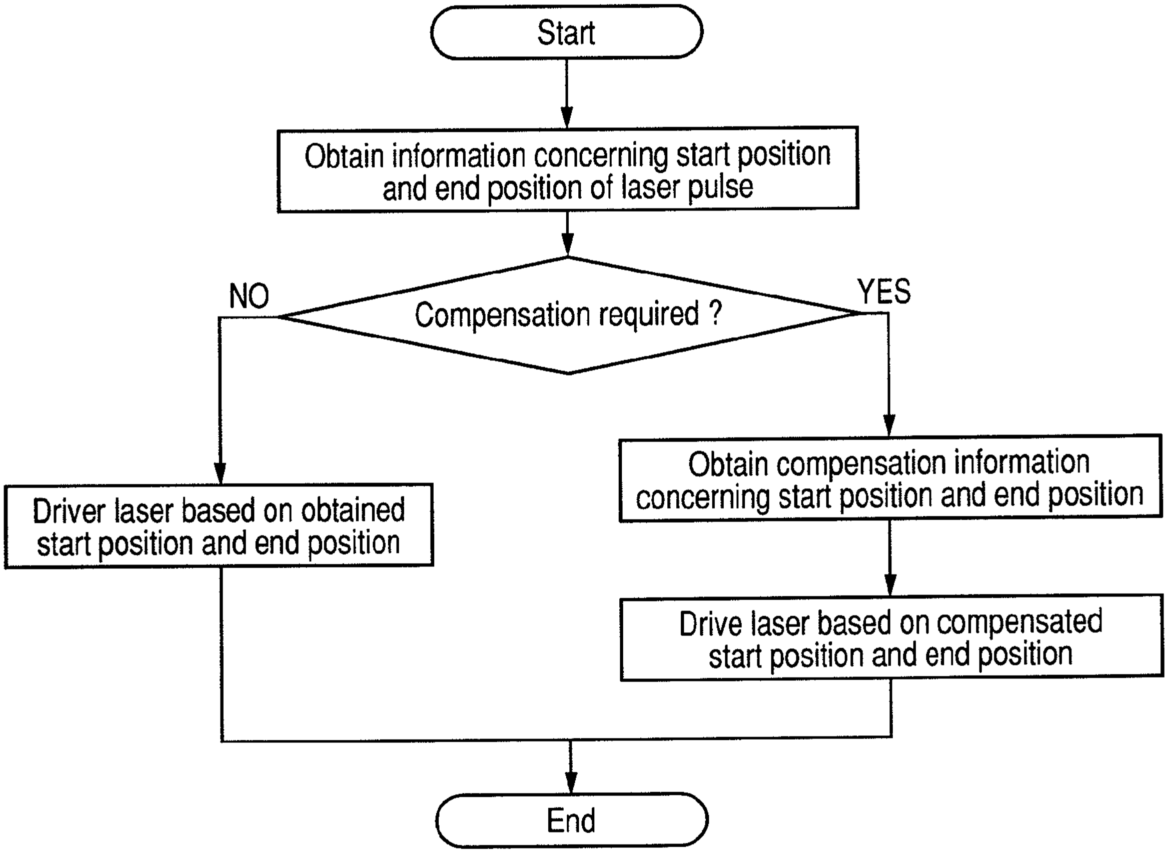
FIG. 19 is a flowchart showing the procedure of a recording method according to the invention.

FIG. 19 is a flowchart illustrating an information recording method according to the invention. Information concerning a start position and an end position of a laser pulse for forming a recording mark is obtained by referring to a first table in accordance with use data. If it is not necessary to compensate the start position and the end position of the laser pulse, a recording mark is formed on an optical disk by driving a laser based on the obtained start position and end position. If it is necessary to compensate the start position and the end position of the laser pulse, the amount of compensation of the start position of the laser pulse and the amount of compensation of the end position are obtained by referring to a second table based on the recording mark length, the preceding space length, the further preceding mark length, and the space length following the recording mark. The recording mark is formed on the optical disk by generating a laser pulse that starts at a start position compensated by the amount of compensation of the start position and ends at an end position compensated by the amount of compensation of the end position.

The invention is used in a recording method, a laser driving apparatus, and an optical disk apparatus for recording data on a recordable optical disk medium.

It should be understood by those skilled in the art that various modifications, combinations, sub-combinations and alterations may occur depending on design requirements and other factors insofar as they are within the scope of the appended claims or the equivalents thereof.

What is claimed is:

1. A method for recording information by irradiating an optical disk medium with an intensity-modulated laser pulse to form a recording mark thereon, the method comprising the steps of:

obtaining information concerning a start position and an end position of the laser pulse for forming the recording mark by referring to a first table;

obtaining the amount of compensation of the start position of the laser pulse and the amount of compensation of the end position by referring to a second table based on a recording mark length, a preceding space length, a further preceding mark length, and a space length following the recording mark; and generating a laser pulse that starts at a start position compensated by the amount of compensation of the start position and ends at an end position compensated by the amount of compensation of the end position.

2. The method according to claim 1, wherein the first table includes a start position table storing the start position, with the recording mark length and the space length preceding the recording mark being parameters, and an end position table storing the end position, with the recording mark length and the following space length being parameters; and the second table includes a start position compensation table storing the amount of compensation of the start position, with the recording mark length, the preceding space length, and the further preceding mark length being parameters, and an end position compensation table storing the amount of compensation of the end position, with the recording mark length, the preceding space length, the further preceding mark length, and the space length following the recording mark being parameters.

3. A method for recording information by irradiating an optical disk medium with an intensity-modulated laser pulse to form a recording mark thereon, the method comprising the steps of:

obtaining information concerning a start position and an end position of the laser pulse for forming the recording mark by referring to a first table;

determining whether a combination pattern of a space length preceding the recording mark and a further preceding mark length is a pre-registered pattern;

generating a laser pulse that starts at the start position and ends at the end position if the pattern is not the pre-registered pattern;

obtaining the amount of compensation of the start position of the laser pulse and the amount of compensation of the end position by referring to a second table based on a recording mark length, the preceding space length, and a space length following the recording mark if the pattern is the pre-registered pattern; and generating a laser pulse that starts at a start position compensated by the amount of compensation of the start position and ends at an end position compensated by the amount of compensation of the end position.

4. The method according to claim 3, wherein the pre-registered pattern is a combination of a space length of the shortest space preceding the recording mark and a further preceding mark length of the shortest mark.

5. The method according to claim 3, wherein in the case where the combination pattern of the space length preceding the recording mark and the further preceding mark length is not the pre-registered pattern, the first table includes a start position table storing the start position, with the recording mark length and the space length preceding the recording mark being parameters, and an end position table storing the end position, with the recording mark length and the following space length being parameters; and in the case where the combination pattern of the space length preceding the recording mark and the further preceding mark length is the pre-registered pattern, the second table includes a start position compensation table storing the amount of compensation of the start position, with the recording mark length being parameters, and an end position compensation table storing the amount of compensation of the end position, with the recording mark length and the space length following the recording mark being parameters.

6. The method according to claim 5, wherein the amount of compensation of the end position does not depend on the space length following the recording mark, and if the recording mark length is not less than a predetermined length, the amount of compensation of the end position is zero.

7. A method for recording information by irradiating an optical disk medium with an intensity-modulated laser pulse to form a recording mark thereon, the method comprising the steps of:

obtaining information concerning a start position and an end position of the laser pulse for forming the recording mark by referring to a first table based on a recording mark length and a space length preceding the recording mark;

determining whether a mark length preceding the recording mark coincides with a pre-registered mark length;

generating a laser pulse that starts at the start position obtained from the first table and ends at the end position if the mark length preceding the recording mark does not coincide with the pre-registered mark length;

obtaining the amount of compensation of the start position of the laser pulse and the amount of compensation of the end position by referring to a second table based on the recording mark length and the space length preceding the recording mark if the mark length preceding the recording mark coincides with the pre-registered mark length; and generating a laser pulse that starts at a start position compensated by the amount of compensation of the start position and ends at an end position compensated by the amount of compensation of the end position.

8. The method according to claim 7, wherein the pre-registered mark length is the shortest mark.

9. The method according to claim 7, wherein the amount of compensation of the end position does not depend on the space length preceding the recording mark, and if the recording mark length is not less than a predetermined length, the amount of compensation of the end position is zero.

10. The method according to claim 9, wherein the end position of the laser pulse in the first table does not depend on the space length preceding the recording mark.

11. An optical disk apparatus for recording information by irradiating an optical disk medium with an intensity-modulated laser pulse to form a recording mark thereon, the apparatus comprising:

a laser light source;

a laser driver for generating a laser pulse by intensity-modulating the laser light source;

an encoder for generating a data sequence corresponding to the recording mark and a space to be recorded on the optical disk;

a recording pulse table for storing information concerning a start position and an end position of the laser pulse for forming the recording mark and information concerning the amount of compensation of the start position and the end position; and a controller for driving the laser driver by setting the start position and the end position of the laser pulse for forming the recording mark from the data sequence generated by the encoder by referring to the recording pulse table, wherein the recording pulse table includes a start position table storing the start position, with a recording mark length and a space length preceding the recording mark being parameters;

an end position table storing the end position, with the recording mark length and a following space length being parameters;

a start position compensation table storing the amount of compensation of the start position, with the recording mark length, the preceding space length, and a further preceding mark length being parameters; and an end position compensation table storing the amount of compensation of the end position, with the recording mark length, the preceding space length, the further preceding mark length, and the space length following the recording mark being parameters.

12. An optical disk apparatus for recording information by irradiating an optical disk medium with an intensity-modulated laser pulse to form a recording mark thereon, the apparatus comprising:

a laser light source;

a laser driver for generating a laser pulse by intensity-modulating the laser light source;

an encoder for generating a data sequence corresponding to the recording mark and a space to be recorded on the optical disk;

a recording pulse table for storing information concerning a start position and an end position of the laser pulse for forming the recording mark and information concerning the amount of compensation of the start position and the end position; and a controller for driving the laser driver by setting the start position and the end position of the laser pulse for forming the recording mark from the data sequence generated by the encoder by referring to the recording pulse table, wherein the recording pulse table includes a first table storing information concerning the start position and the end position of the laser pulse for forming the recording mark, and a second table storing information concerning the amount of compensation for compensating the start position and the end position of the laser pulse stored in the first table in the case where a combination pattern of a space length preceding the recording mark and a further preceding mark length is a pre-registered pattern; and the second table stores the amount of compensation of the start position of the laser pulse and the amount of compensation of the end position, with a recording mark length, the preceding space length, and a space length following the recording mark being parameters.

13. The apparatus according to claim 12, wherein the pre-registered pattern is a combination of a space length of the shortest space preceding the recording mark and a further preceding mark length of the shortest mark.

14. The apparatus according to claim 12, wherein in the case where the combination pattern of the space length preceding the recording mark and the further preceding mark length is not the pre-registered pattern, the first table includes a start position table storing the start position, with the recording mark length and the space length preceding the recording mark being parameters, and an end position table storing the end position, with the recording mark length and the following space length being parameters; and in the case where the combination pattern of the space length preceding the recording mark and the further preceding mark length is the pre-registered pattern, the second table includes a start position compensation table storing the amount of compensation of the start position, with the recording mark length being parameters, and an end position compensation table storing the amount of compensation of the end position, with the recording mark length and the space length following the recording mark being parameters.

15. The apparatus according to claim 14, wherein the amount of compensation of the end position does not depend on the space length following the recording mark, and if the recording mark length is not less than a predetermined length, the amount of compensation of the end position is zero.

16. An optical disk apparatus for recording information by irradiating an optical disk medium with an intensity-modulated laser pulse to form a recording mark thereon, the apparatus comprising:

a laser light source;

a laser driver for generating a laser pulse by intensity-modulating the laser light source;

an encoder for generating a data sequence corresponding to the recording mark and a space to be recorded on the optical disk;

a recording pulse table for storing information concerning a start position and an end position of the laser pulse for forming the recording mark and information concerning the amount of compensation of the start position and the end position; and a controller for driving the laser driver by setting the start position and the end position of the laser pulse for forming the recording mark from the data sequence generated by the encoder by referring to the recording pulse table, wherein the recording pulse table includes a first table storing information concerning the start position and the end position of the laser pulse for forming the recording mark, with a recording mark length and a space length preceding the recording mark being parameters, and a second table storing information concerning the amount of compensation for compensating the start position and the end position of the laser pulse stored in the first table in the case where a mark length preceding the recording mark coincides with a pre-registered mark length; and the second table stores the amount of compensation of the start position of the laser pulse and the amount of compensation of the end position, with the recording mark length and the space length preceding the recording mark being parameters.

17. The apparatus according to claim 16, wherein the pre-registered mark length is the shortest mark.

18. The apparatus according to claim 16, wherein the amount of compensation of the end position does not depend on the space length preceding the recording mark, and if the recording mark length is not less than a predetermined length, the amount of compensation of the end position is zero.

19. The apparatus according to claim 18, wherein the end position of the laser pulse in the first table does not depend on the space length preceding the recording mark.

* * * * *